(No Model.)  J. F. APPLEBY.  3 Sheets—Sheet 2.
SELF BINDER.

No. 552,503.  Patented Jan. 7, 1896.

Witnesses,  Inventor, (No Model.) 3 Sheets—Sheet 3.

J. F. APPLEBY.
SELF BINDER.

No. 552,503. Patented Jan. 7, 1896.

UNITED STATES PATENT OFFICE.

JOHN F. APPLEBY, OF CHICAGO, ASSIGNOR TO CHARLES F. CRAVER, OF HARVEY, ILLINOIS.

SELF-BINDER.

SPECIFICATION forming part of Letters Patent No. 552,503, dated January 7, 1896.

Application filed March 7, 1894. Serial No. 502,654. (No model.)

*To all whom it may concern:*

Be it known that I, JOHN F. APPLEBY, of Chicago, Illinois, have invented certain new and useful Improvements in Self-Binders, of which the following is a specification.

This invention relates to certain improvements in self-binding harvesters, and more particularly to a tripping mechanism for imparting an intermittent vibratory motion to the packers and needle-shaft, whereby the grain is compressed to form the gavel and the needle is moved to divide the flowing grain from the gavel and to carry the binding-cord over the latter.

Figure 1:
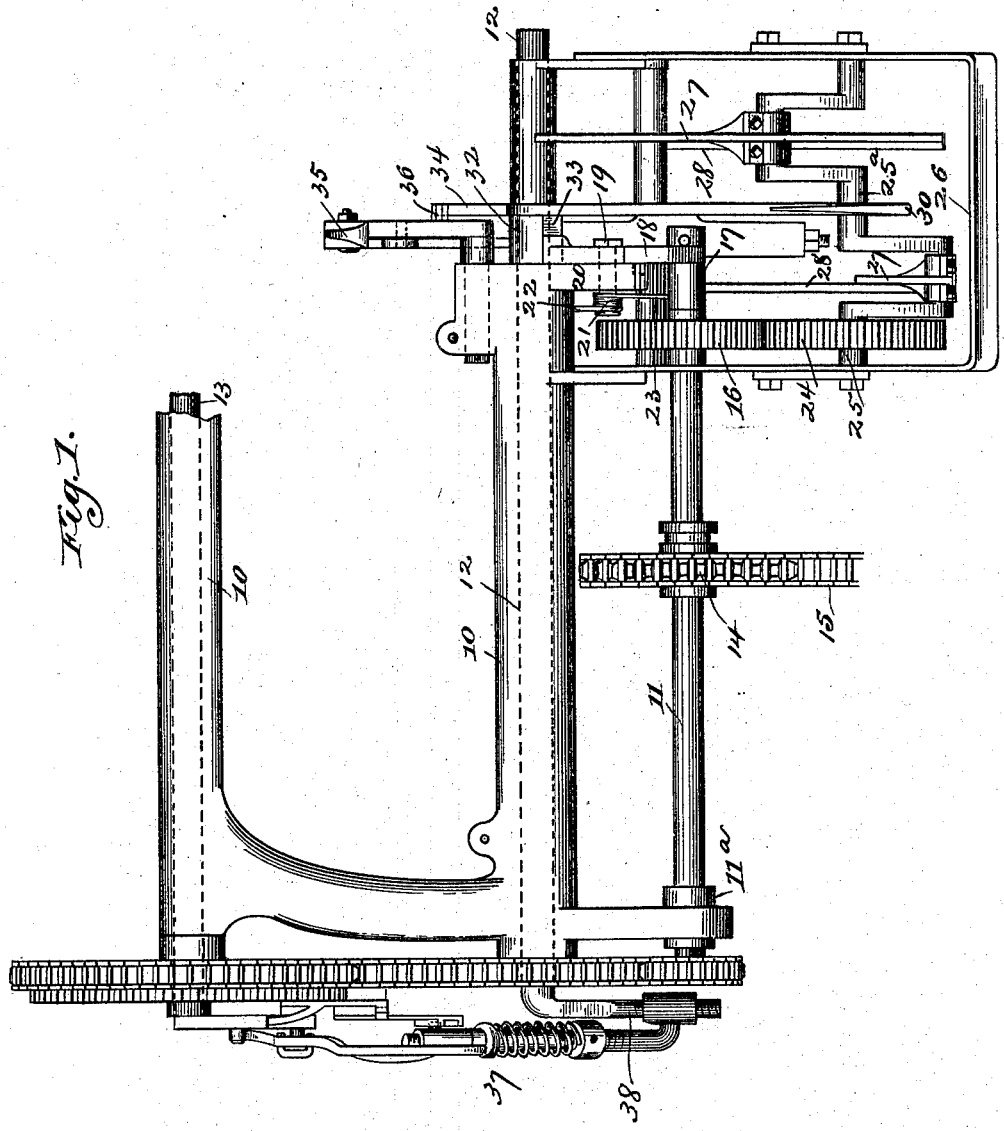
Figure 2:
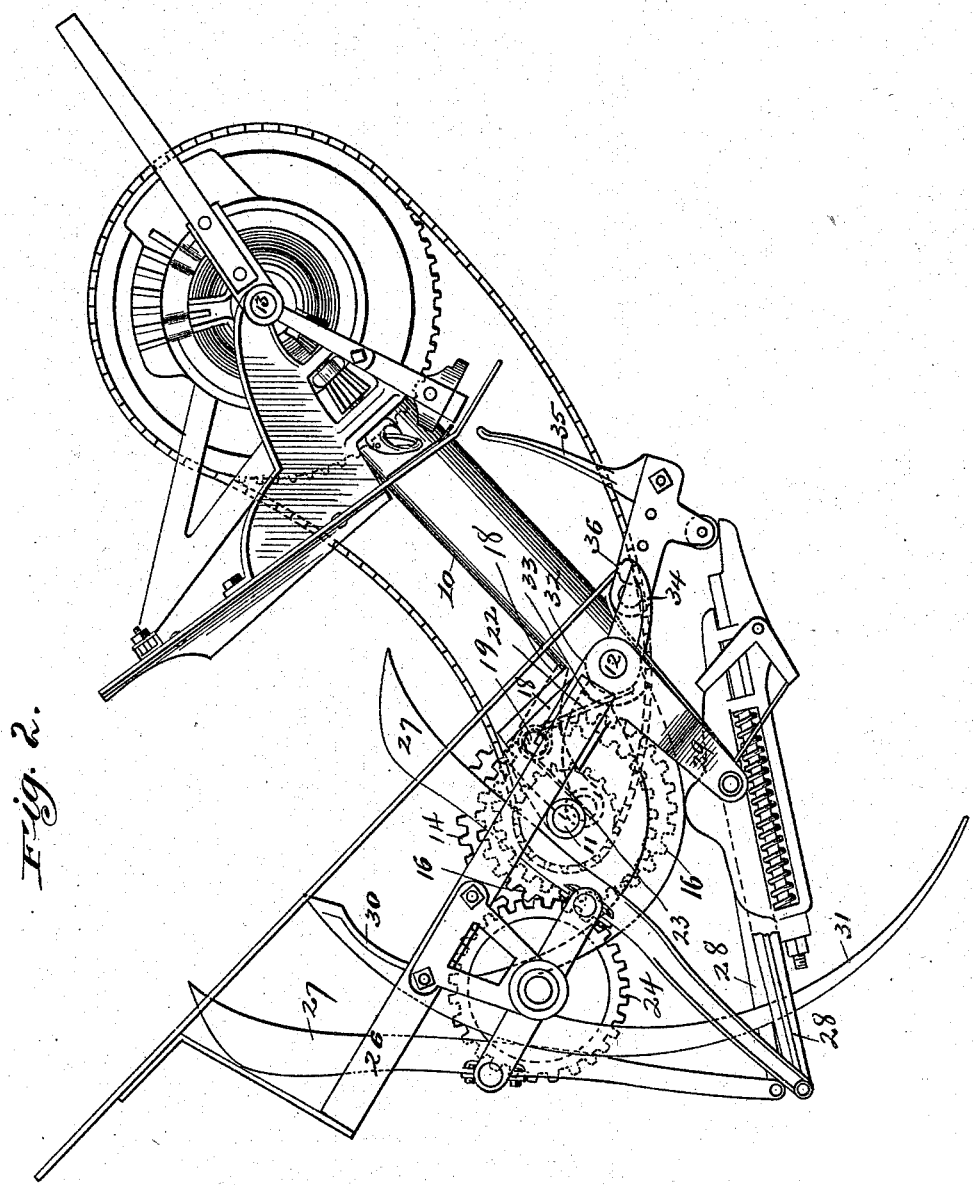
Figure 3:
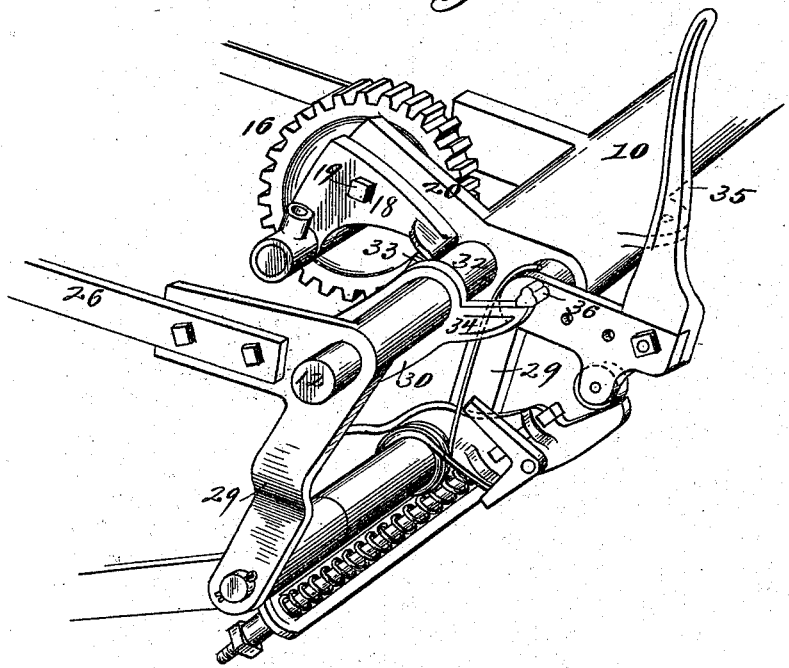
Figure 4:
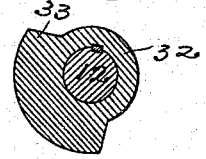
Figure 5:
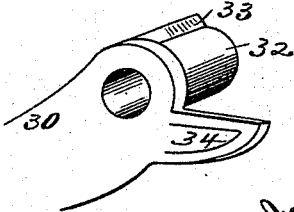

In the drawings, Figure 1 is a plan view of the binder-frame, showing the tripping mechanism and coacting parts. Fig. 2 is a side elevation showing the cord-tying mechanism also in place. Fig. 3 is a detail perspective view of the tripping mechanism. Fig. 4 is a sectional detail through the needle-shaft and hub of the needle, showing a cam-flange thereon. Fig. 5 is a perspective view of the sleeved hub of the needle.

In the drawings, 10 represents the binder-frame, which furnishes bearings for the driving-shaft 11, the needle-shaft 12, and the counter-shaft 13. The driving-shaft 11 has the driving-gear 14 thereon, over which a drive-chain 15 is carried. The shaft 11 is loosely mounted in the box 11ª, in order to permit a slight lateral movement of its opposite end. Said shaft also carries a spur-gear 16, and beyond said spur-gear is journaled a box 17 on a bell-crank 18.

19 represents the pivot of the bell-crank which passes through a lug 20 of the frame 10, and coiled about the projected end of said pivot is the spring 21 having the oppositely-projecting arms 22 23, the arm 22 engaging the frame 10 and the arm 23 passing under the box 17 in such manner as to normally hold the bell-crank in position shown by the full lines in Fig. 2, in which position the wheel 16 is enmeshed with the teeth of the spur-gear 24 on the crank-shaft 25, the latter having its bearing in a supplemental frame 26. Upon the cranks of the shaft 25 are mounted the packers 27. These packers are connected by the links 28 with the depending lugs 29 by pivots which permit the vibration of the packers as the crank-shaft is rotated.

The needle 30 is secured upon the needle-shaft 12 and also rests upon the straight portion 25ª of the crank-shaft 25, on which the packers are mounted. The needle has the fender or guard-piece 31, which arrests the flowing grain while the gavel is being bound. The needle has a sleeved hub 32 with a cam-flange 33 on one side thereof and a projecting arm 34 on its opposite side.

35 represents a compressor-arm, which is pivotally mounted on the frame adjacent to the hub of the needle, and said compressor-arm has a pin or projection 36 adapted to ride on the arm 34 of the hub. The accumulation of grain to form the gavel operates to force the compressor-arm back, and through its engagement with the arm 34 of the needle, the latter being secured upon its shaft, the needle-shaft is slightly rocked. This slight rocking movement of the needle-shaft operates a clutch mechanism, which is shown at the left of Fig. 1, and which is carried by a pitman 37 connected with a crank 38 on the needle-shaft. The reciprocation of the pitman will effect the further rocking of the needle-shaft, and during such further rocking movement the cam 33 on the sleeve-hub of the needle will engage the heel of the bell-crank 18, rocking the latter upon its pivot and moving the shaft 11 into position shown by the dotted lines in Fig. 2, and thus carrying the gear 16 out of mesh with the gear 24. This causes the packer-shaft to cease movement, and the packers therefore remain idle during the operation of binding the gavel. Upon the return of the needle into position to permit the formation of a new gavel, the bell-crank is returned to its normal position by the spring 21 and the gears 16 and 24 are again enmeshed.

It will be understood that the gear 16 is in constant revolution, and therefore its engagement with the gear 24 is rendered easy. In effect, instead of thrusting the gear-teeth into engagement, they are rolled into such engagement, and an intermittent movement is thus communicated to the packer-shaft from the constantly-rotating driving-shaft. This rolling engagement of the gears is due to the fact that one end of the driving-shaft is pivoted in the bell-crank eccentric to the pivot of the latter. As the bell-crank is rocked around its pivot the end of the driving-shaft and the gear 16 carried thereon move in the arc of a circle whose center is the center of the bell-crank. Resistance upon the packers, due to the accumulation of the grain forming the gavel, of course resists the tendency of the gear-wheel on the packer-shaft to turn freely, and when the driving-shaft is thrust by its spring into such position that the teeth of the gear upon the driving-shaft touch the teeth of the gear on the packer-shaft the resistance of the latter is such as to cause the gear on the driving-shaft to rise up or roll into positive engagement with the gear on the packer-shaft. This movement is further facilitated, and indeed rendered certain, by the fact that the end of the driving-shaft swings in the arc of a circle, thus tending to carry its driving-gear upward and toward the gear on the packer-shaft.

I have not thought it necessary to describe the particular mechanism whereby the needle-shaft is rocked so as to impart the full stroke to the needle, as the clutch mechanism by which this is accomplished forms the subject-matter of a separate application, and also because other means for rocking the needle-shaft may be provided than those which are here shown.

What I claim, and desire to secure by Letters Patent, is—

1. In a self-binder, the combination with a packer shaft and its gear wheel, of a driving shaft pivotally mounted at one end and having its opposite end mounted in a swinging bearing, a gear wheel on the driving shaft adapted to engage the packer shaft gear, and means for imparting the swinging movement to the driving shaft whereby to roll its gear into and out of contact with the packer shaft gear, substantially as described.

2. The combination with a constantly running driving shaft having a gear thereon, of a packer shaft having a gear, the driving shaft having a swinging movement whereby the gear thereon may be rolled into and out of engagement with the packer shaft gear, substantially as described.

3. In a self-binder, the combination with a packer shaft having a gear thereon, of a constantly running driving shaft, said shaft being pivotally mounted at one end and a pivoted bell crank having a bearing for the opposite end of the driving shaft, a gear wheel on the driving shaft and means for rocking the bell crank on its pivot whereby to engage and disengage the driving gear from the packer shaft gear, substantially as described.

4. In a self-binder, the combination with a packer shaft having a gear thereon, of a constantly running driving shaft, said shaft being pivotally mounted at one end, a pivoted bell crank having a bearing for the opposite end of the driving shaft, a gear on the driving shaft, a spring adapted to rock the bell crank on its pivot to effect the enmeshing of the gears and a cam on the needle shaft adapted to rock the bell crank whereby to effect the disengagement of said gears, substantially as described.

JOHN F. APPLEBY.

Witnesses:
JOHN G. PETTIT,
ELNATHAN PETTIT.